United States Patent
Liu

(10) Patent No.: US 9,333,431 B2
(45) Date of Patent: May 10, 2016

(54) METHOD, DEVICE AND COMPUTER STORAGE MEDIUM FOR CONTROLLING DISPLAYING

(71) Applicant: TENCENT TECHNOLOGY (SHENZHEN) COMPANY LIMITED, Shenzhen, Guangdong (CN)

(72) Inventor: Zhen Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/399,551

(22) PCT Filed: May 3, 2013

(86) PCT No.: PCT/CN2013/075152
§ 371 (c)(1),
(2) Date: Feb. 6, 2015

(87) PCT Pub. No.: WO2013/166940
PCT Pub. Date: Nov. 14, 2013

(65) Prior Publication Data
US 2015/0148124 A1    May 28, 2015

(30) Foreign Application Priority Data
May 10, 2012   (CN) .......................... 2012 1 0143150

(51) Int. Cl.
*A63F 13/00* (2014.01)
*A63F 13/35* (2014.01)
(Continued)

(52) U.S. Cl.
CPC ................. *A63F 13/35* (2014.09); *A63F 13/12* (2013.01); *A63F 13/77* (2014.09); *G06Q 10/10* (2013.01); *A63F 13/795* (2014.09)

(58) Field of Classification Search
CPC ....... A63F 13/32; A63F 13/327; A63F 13/34; A63F 13/79
USPC .......................................... 463/16, 20, 25, 42
See application file for complete search history.

(56) References Cited

U.S. PATENT DOCUMENTS

| 6,401,122 B1 | 6/2002 | Matsui et al. |
| 8,491,393 B2 | 7/2013 | Yang |
| 2006/0167991 A1* | 7/2006 | Heikes et al. .................. 709/204 |
| 2007/0087829 A1 | 4/2007 | Liu et al. |

(Continued)

FOREIGN PATENT DOCUMENTS

| CN | 1855108 A | 11/2006 |
| CN | 101038607 A | 9/2007 |

(Continued)

OTHER PUBLICATIONS

European Search Report for Application No. 13788304.7, dated Apr. 23, 2015.

(Continued)

*Primary Examiner* — James S McClellan
(74) *Attorney, Agent, or Firm* — Harness, Dickey & Pierce, P.L.C.

(57) ABSTRACT

Examples of the present disclosure may provide a method, device or computer storage medium. The method may include: determining whether a registered first client terminal device and a registered second client terminal device are located at a same scene; sending information of the second client terminal device to the first client terminal device if the first client terminal device and the second client terminal device are located at the same scene, so that the first client terminal device displays the information of the second client terminal device in a visual list of the first client terminal device; and sending information of the first client terminal device to the second client terminal device, so that the second client terminal device displays the information of the first client terminal device in a visual list of the second client terminal device.

19 Claims, 3 Drawing Sheets

(51) Int. Cl.
*G06Q 10/10* (2012.01)
*A63F 13/30* (2014.01)
*A63F 13/77* (2014.01)
*A63F 13/795* (2014.01)

(56) References Cited

U.S. PATENT DOCUMENTS

| | | |
|---|---|---|
| 2008/0009352 A1 | 1/2008 | Aoyama et al. |
| 2009/0011829 A1 | 1/2009 | Yang |
| 2009/0088259 A1 | 4/2009 | Gosztyla et al. |
| 2010/0228560 A1* | 9/2010 | Balasaygun et al. ........... 705/1.1 |
| 2011/0185290 A1* | 7/2011 | Kim et al. .................... 715/753 |

FOREIGN PATENT DOCUMENTS

| | | |
|---|---|---|
| CN | 101448335 A | 6/2009 |
| JP | 10-040197 A | 2/1998 |
| JP | 2002183762 A | 6/2002 |
| JP | 2008-012112 A | 1/2008 |
| JP | 2009187147 A | 8/2009 |

OTHER PUBLICATIONS

English Translation of International Preliminary Report for Application No. PCT/CN2013/075152, dated Nov. 11, 2014.
International Search Report for PCT/CN2013/075152, ISA/CN, mailed Aug. 8, 2013.
Written Opinion of the International Searching Authority for PCT/CN2013/075152 (English Translation and original Chinese language version), mailed Aug. 8, 2013; ISA/CN.
Korean Office Action for Application No. 10-2014-7034498 dated Nov. 11, 2015, and its English translation hereof.
Japanese Office Action for Application No. 2015-510622 dated Jan. 5, 2016, and its English translation thereof.

* cited by examiner

METHOD, DEVICE AND COMPUTER STORAGE MEDIUM FOR CONTROLLING DISPLAYING

CROSS REFERENCE TO RELATED APPLICATIONS

This application is a 371 U.S. National Phase of International Application No. PCT/CN2013/075152, filed on May 3, 2013, which claims priority to Chinese patent application No. 201210143150.9, filed on May 10, 2012, the contents of which are incorporated herein by reference in their entirety.

FIELD

The present disclosure relates to a computer network technology field, and more particularly, to a method, device and computer storage medium for controlling displaying.

BACKGROUND

With rapid development of network technologies, online games gradually play an important role in people's leisure life and greatly enrich the people's leisure life. A large scale multi-player online playing game (such as World of Warcraft) is more popular.

In a conventional method, in the large scale multi-player online playing game, a visual user of a client terminal device may be controlled with a "Sudoku". A scene may be divided into "Sudoku" areas. Information of other client terminal devices registered into the same area of the same scene may be displayed in the "Sudoku" of the client terminal device. The other client terminal devices may be the visual users of the client terminal device.

Number of visual users provided by different types of client terminal devices may be different. Generally, the number of visual users provided by the client terminal device, such as a Personal Computer (PC) or a tablet PC may be larger than that provided by the client terminal device, such as a mobile phone. The inventor may find that the conventional scheme for controlling the displaying may cause visual list asymmetry. For instance, a visual list of a PC A may include information of a mobile phone B. Since the number of visual users supported by the mobile phone B may be less than that supported by the PC A, the visual list of the mobile phone B may not include the PC A. Therefore, the visual list of the PC A and the mobile phone B may be asymmetric which is inconvenient for information interaction and transfer during a game.

SUMMARY

In order to solve the conventional problem, examples of the present disclosure may provide a method and device for controlling displaying. The technical scheme may be as follows.

On the one hand, an example of the present disclosure provides a method for controlling displaying, including:

determining whether a registered first client terminal device and a registered second client terminal device are located at a same scene;

obtaining number of visual users of the first client terminal device and number of client terminal devices currently displayed in a visual list of the first client terminal device;

sending information of the second client terminal device to the first client terminal device if the first client terminal device and the second client terminal device are located at the same scene and the number of the client terminal devices currently displayed in the visual list of the first client terminal device is less than the number of the visual users of the first client terminal device, so that the first client terminal device displays the information of the second client terminal device in the visual list of the first client terminal device; and sending information of the first client terminal device to the second client terminal device, so that the second client terminal device displays the information of the first client terminal device in a visual list of the second client terminal device.

The method further includes:

determining whether there is a preset relationship between the first client terminal device and the second client terminal device if the number of the client terminal devices currently displayed in the visual list of the first client terminal device is not less than the number of the visual users of the first client terminal device;

prioritizing the client terminal devices currently displayed in the visual list of the first client terminal device if there is a preset relationship between the first client terminal device and the second client terminal device, deleting information of a client terminal device with the lowest priority from the visual list of the first client terminal device and sending the information of the second client terminal device to the first client terminal device.

Before sending the information of the first client terminal device to the second client terminal device, the method further includes:

obtaining number of visual users of the second client terminal device and number of client terminal devices currently displayed in the visual list of the second client terminal device;

sending the information of the first client terminal device to the second client terminal device if the number of the client terminal devices currently displayed in the visual list of the second client terminal device is less than the number of the visual users of the second client terminal device.

The method further includes:

determining whether there is a preset relationship between the first client terminal device and the second client terminal device if the number of the client terminal devices currently displayed in the visual list of the second client terminal device is not less than the number of the visual users of the second client terminal device;

prioritizing the client terminal devices currently displayed in the visual list of the second client terminal device if there is a preset relationship between the first client terminal device and the second client terminal device, deleting information of a client terminal device with the lowest priority from the visual list of the second client terminal device and sending the information of the first client terminal device to the second client terminal device.

The preset relationship includes: belonging to a same group or belonging to an associated group.

On the other hand, another example of the present disclosure provides a device for controlling displaying, including: a first determination module, a first sending module and a second sending module, a first obtaining module and a first controlling module.

The first determination module is to determine whether a registered first client terminal device and a registered second client terminal device are located at a same scene;

the first obtaining module is to obtain number of visual users of the first client terminal device and number of client terminal devices currently displayed in a visual list of the first client terminal device;

the first controlling module is to control the first sending module to send information of the second client terminal device to the first client terminal device if the number of the client terminal devices currently displayed in the visual list of the first client terminal device is less than the number of the visual users of the first client terminal device;

the first sending module is to send the information of the second client terminal device to the first client terminal device if the first client terminal device and the second client terminal device are located at the same scene, so that the first client terminal device displays the information of the second client terminal device in the visual list of the first client terminal device; and the second sending module is to send information of the first client terminal device to the second client terminal device if the first client terminal device and the second client terminal device are located at the same scene, so that the second client terminal device displays the information of the first client terminal device in a visual list of the second client terminal device.

The device further includes:

a second determination module, to determine whether there is a preset relationship between the first client terminal device and the second client terminal device if the number of the client terminal devices currently displayed in the visual list of the first client terminal device is not less than the number of the visual users of the first client terminal device;

a second controlling module, to prioritize the client terminal devices currently displayed in the visual list of the first client terminal device if there is a preset relationship between the first client terminal device and the second client terminal device, delete information of a client terminal device with the lowest priority from the visual list of the first client terminal device and control the first sending module to send the information of the second client terminal device to the first client terminal device.

The device further includes:

a second obtaining module, to obtain number of visual users of the second client terminal device and number of client terminal devices currently displayed in the visual list of the second client terminal device; and a third controlling module, to control the second sending module to send the information of the first client terminal device to the second client terminal device if the number of the client terminal devices currently displayed in the visual list of the second client terminal device is less than the number of the visual users of the second client terminal device.

The device further includes:

a third determination module, to determine whether there is a preset relationship between the first client terminal device and the second client terminal device if the number of the client terminal devices currently displayed in the visual list of the second client terminal device is not less than the number of the visual users of the second client terminal device;

a fourth controlling module, to prioritize the client terminal devices currently displayed in the visual list of the second client terminal device if there is a preset relationship between the first client terminal device and the second client terminal device, delete information of a client terminal device with the lowest priority from the visual list of the second client terminal device and control the second sending module to send the information of the first client terminal device to the second client terminal device.

The technical scheme provided by examples of the present disclosure may bring following technical effects. When the first client terminal device and the second client terminal device are located at the same scene, the information of the second client terminal device may be sent to the first client terminal device, so that the first client terminal device may display the information of the second client terminal device in the visual list of the first client terminal device. The information of the first client terminal device may be sent to the second client terminal device, so that the second client terminal device may display the information of the first client terminal device in the visual list of the second client terminal device. With examples of the present disclosure, while ensuring that the information of the second client terminal device may be displayed on the first client terminal device, the information of the first client terminal device may also be displayed on the second client terminal device. Therefore, the visual list of the first client terminal device and the second client terminal device may be symmetric which may be convenient for the information interaction and transfer between the first client terminal device and the second client terminal device.

BRIEF DESCRIPTION OF THE DRAWINGS

In order to clearly describe the technical scheme in the present disclosure, a brief description is given to accompanying figures used in following examples. Obviously, the accompanying figures described hereinafter are some examples in the present disclosure. An ordinary skilled in the art may obtain other figures with these accompanying figures without creative work.

DETAILED DESCRIPTION

In order to make objectives, technical solutions and advantages of the present invention more apparent, the present invention will be described in detail hereinafter with reference to accompanying drawings.

The First Example

Figure 1:
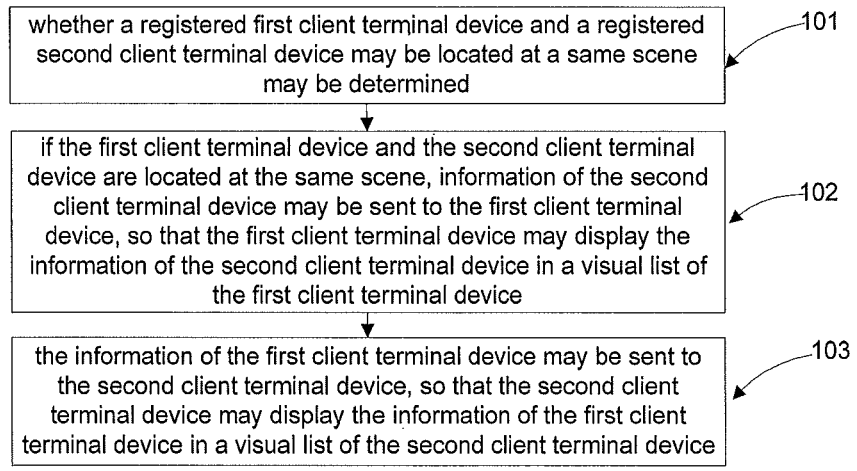
FIG. 1 is a flow chart illustrating a method for controlling displaying in accordance with a first example of the present disclosure.

Referring to FIG. 1, FIG. 1 provides a method for controlling displaying. The method may include following blocks.

In block 101, whether a registered first client terminal device and a registered second client terminal device may be located at a same scene may be determined.

In block 102, if the first client terminal device and the second client terminal device are located at the same scene, information of the second client terminal device may be sent to the first client terminal device, so that the first client terminal device may display the information of the second client terminal device in a visual list of the first client terminal device.

In block 103, the information of the first client terminal device may be sent to the second client terminal device, so that the second client terminal device may display the information of the first client terminal device in a visual list of the second client terminal device.

The technical scheme provided by this example of the present disclosure may bring following technical effects. When the first client terminal device and the second client terminal device are located at the same scene, the information of the second client terminal device may be sent to the first client terminal device, so that the first client terminal device may display the information of the second client terminal device in the visual list of the first client terminal device. The information of the first client terminal device may be sent to the second client terminal device, so that the second client terminal device may display information of the first client terminal device in the visual list of the second client terminal device. With this example of the present disclosure, while ensuring that the first client terminal device may display the information of the second client terminal device, the second client terminal device also may display the information of the first client terminal device. Therefore, the visual list of the first client terminal device and the second client terminal device may be symmetric which may be convenient for the information interaction and transfer between the first client terminal device and the second client terminal device.

The Second Example

Figure 2:
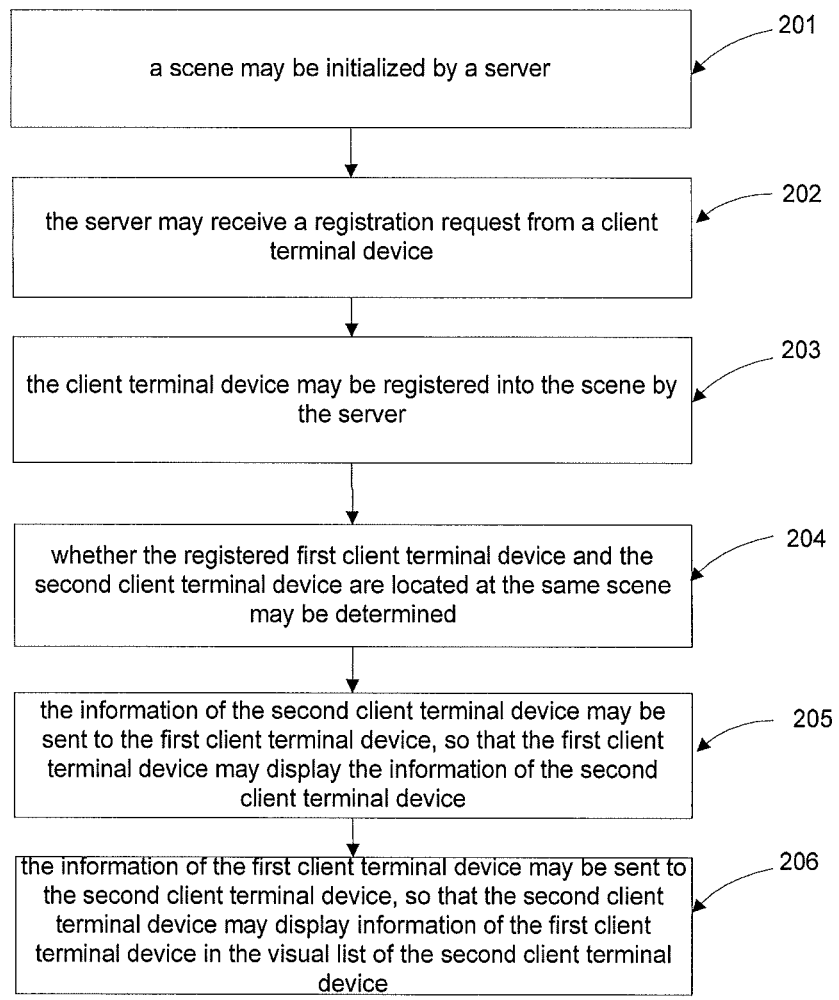
FIG. 2 is a flow chart illustrating a method for controlling displaying in accordance with a second example of the present disclosure.

An example of the present disclosure may provide a method for controlling displaying. Referring to FIG. 2, the method may include following blocks.

In block 201, a scene may be initialized by a server. The server may equably divide the scene into multiple areas.

The method for equally dividing the scene into the multiple areas by the server may include equally dividing the scene into the multiple areas according to display pixels of the scene. For instance, each display pixel in the scene may be divided into an area.

According to an example, before a client terminal device plays a game, the user may need to register into the scene. The scene may include resources allocated by the server for multiple client terminal devices for playing the game. The client terminal devices registered in the scene may see each other. Therefore, the client terminal devices registered in the same scene may play the game with each other.

In block 202, the server may receive a registration request from a client terminal device. The registration request may include an Identity (ID) of the client terminal device, a type of the client terminal device and a registration ID of the client terminal device. The registration ID may include a scene ID and an area ID.

In block 203, the client terminal device may be registered into the scene by the server. The client terminal device may be registered into an area corresponding to the area ID in the scene identified by the scene ID.

Figure 3:
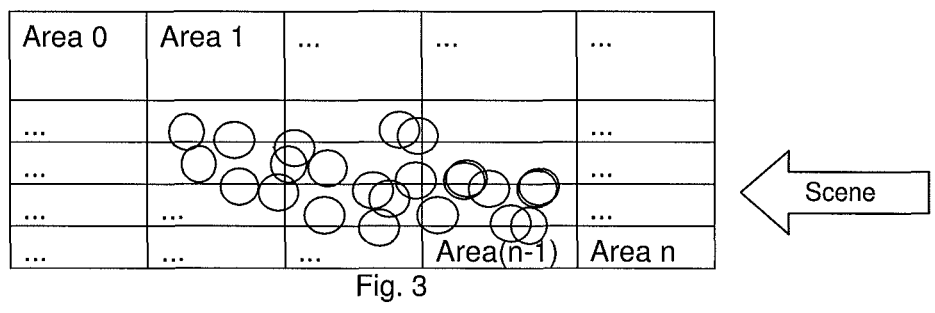
FIG. 3 is an example illustrating division of a scene and registration of client terminal devices in the scene.

FIG. 3 is an example illustrating division of a scene and registration of client terminal devices in the scene provided by the present disclosure. The scene in FIG. 3 may be divided into n areas according to display pixels of the scene. Circles in the FIG. 3 may be the client terminal devices registered into the scene.

After the client terminal devices are registered into the scene by the server, a corresponding relationship between the scene and a registered client terminal device may be recorded. Table 1 may show a corresponding relationship between a scene and a registered client terminal device recorded by a server.

TABLE 1

| Scene | Registered client terminal device (denoted by an ID of the client terminal device) |
|---|---|
| Area 1 | |
| Area 2 | Client terminal device 2 |
| Area 3 | Client terminal devices 1 and 7 |
| Area 4 | Client terminal devices 8, 9, 11 and 15 |
| Area 5 | |
| Area 6 | Client terminal devices 12 and 13 |
| ... | ... |
| ... | ... |
| Area (n-1) | |
| Area n | |

Furthermore, after the client terminal devices are registered into the scene by the server, the server may group the registered client terminal devices. For instance, the server may group the registered client terminal devices into a same group or an associated group and record a corresponding relationship between a registered client terminal device and a group. Table 2 may show a corresponding relationship between a client terminal device and a group recorded by the server.

TABLE 2

| Client terminal device | Group |
|---|---|
| Client terminal device 1, Client terminal device 2 and Client terminal device 3 | A same group |
| Client terminal device 1, Client terminal device 4 and Client terminal device 5 | An associated group |
| Client terminal device 5 and Client terminal device 6 | A same group |
| ... | ... |

According to an example of the present disclosure, if the client terminal devices cooperate with each (for instance, the client terminal devices may cooperate with each other to work on a same task or achieve a goal), the client terminal devices cooperating with each other may be grouped into the same group. If the client terminal devices compete against each other (for instance, the client terminal devices may compete against each other to determine who completes a task first or who achieves a goal first), the client terminal devices competing against each other may belong to the associated group.

With above operations, the client terminal devices registered in the server may play the same. While the client terminal devices play the game, display information of the client terminal devices may be controlled by the server. According to an example of the present disclosure, when the server controls displaying, visual list symmetry among the client terminal devices registered in the server may be ensured. That is, while the first client terminal device displays information of the second client terminal device, the second client terminal device also may display the information of the first client terminal device. The first client terminal device and the second client terminal device may be two different client terminal devices registered in the server. Detailed operations may be shown in block 204.

In block 204, whether the registered first client terminal device and the second client terminal device are located at the same scene may be determined.

If the first client terminal device and the second client terminal device are located at the same scene, blocks 205 and 206 may be performed. According to an example of the present disclosure, blocks 205 and 206 may be executed in any order.

If the first client terminal device and the second client terminal device are not located at the same scene, the flow may be terminated.

The server may determine whether the first client terminal device and the second client terminal device are located at the same scene according to a recorded corresponding relationship between a scene and a registered client terminal device. As shown in FIG. 1, the first client terminal device (client terminal device 1) and the second client terminal device (client terminal device 7) may be located at the same scene.

In block 205, the information of the second client terminal device may be sent to the first client terminal device, so that the first client terminal device may display the information of the second client terminal device.

As an optional example, before block 205, the method may further include following operations.

In operation A1, number of visual users of the first client terminal device may be obtained by the server.

The method for obtaining the number of the visual users of the first client terminal device may include obtaining the number of the visual users of the first client terminal device by searching for a corresponding relationship between a type of a client terminal device and number of visual users according to the type of the first client terminal device.

The pre-stored corresponding relationship between the type of a client terminal device and number of visual users may be shown in table 3.

TABLE 3

| Type of a client terminal device | Number of visual users |
| --- | --- |
| Based on a MediaTek (MKT) platform | 2 |
| Based on a KJava platform | 3 |
| Based on an Iphone platform | 10 |
| Based on an Android platform | 10 |
| ... | ... |

In operation A2, number of client terminal devices currently-displayed in the visual list of the first client terminal device may be obtained.

According to an example, the visual list of the first client terminal device may be stored in the server. Therefore, the server may obtain the number of the client terminal devices currently-displayed in the visual list of the first client terminal device via reading the visual list of the first client terminal device stored in the server. The visual list of the first client terminal device may be shown in table 4.

TABLE 4

| Client terminal device 1 |
| --- |
| Client terminal device 8 |
| Client terminal device 7 |

According to an example of the present disclosure, the operations A1 and A2 may be performed according to any order.

In operation A3, whether the number of the client terminal devices currently-displayed in the visual list of the first client terminal device is less than the number of the visual users of the first client terminal device.

If the number of the client terminal devices currently-displayed in the visual list of the first client terminal devices is less than the number of the visual users of the first client terminal device, block 205 may be performed.

If the number of the client terminal devices currently-displayed in the visual list of the first client terminal device is not less than the number of the visual users of the first client terminal, an operation A4 may be performed.

In operation A4, whether there is a preset relationship between the second client terminal device and the first client terminal device may be determined.

If there is a preset relationship between the second client terminal device and the first client terminal device, the client terminal devices currently-displayed in the visual list of the first client terminal device may be prioritized, information of a client terminal device with the lowest priority in the visual list of the first client terminal device may be deleted and block 205 may be performed.

If there is no preset relationship between the second client terminal device and the first client terminal device, the flow may be terminated.

The preset relationship between the first client terminal device and the second client terminal device may be that the first client terminal and the second client terminal device may belong to the same group, or the first client terminal device and the second client terminal device may belong to an associated group. According to an example of the present disclosure, when the first client terminal device and the second client terminal device cooperate with each other (for instance, the first client terminal device and the second client terminal device may cooperate with each other to work on a same task or achieve a goal) or are friends, the first client terminal device and the second client terminal device may belong to the same group. When the first client terminal device and the second client terminal device compete against each other (for instance, the first client terminal device and the second client terminal device may compete against each other to determine who completes a task first or who achieves a goal first), the first client terminal device and the second client terminal device may belong to an associated group.

According to the example of the present disclosure, whether there is a preset relationship between the first client terminal device and the second client terminal device may be determined by searching for a corresponding relationship between a client terminal device and a group as shown in table 2.

According to an example, the server may set the priority of the client terminal devices currently-displayed in the visual table of the first client terminal device according to at least one of a relationship (such as adjacent, same, etc.) between registration area of each client terminal device currently displayed in the visual list of the first client terminal device and a registration area of the first client terminal device, whether there is a preset relationship between each currently-displayed client terminal device and the first client terminal device and registration time of the each currently-displayed client terminal device. In this example of the present disclosure, the priority of the client terminal devices currently displayed in the visual list of the first client terminal device may further be set according to other attribute information of the currently-displayed client terminal devices, such as recognition of status and level of an operator, to which the currently-displayed client terminal devices belong, in addition to the relationship (such as adjacent, same, etc.) between the registration area of each currently-displayed client terminal device and the registration area of the first client terminal device, whether there is a preset relationship between each currently-displayed client terminal device and the first client terminal device and registration time of the each currently-displayed client terminal device.

According to an example of the present disclosure, if there is a preset relationship between a client terminal device currently displayed in the visual list of the first client terminal device and the first client terminal device, a higher priority may be set for the client terminal device. Accordingly, if there is no preset relationship between the client terminal device currently displayed in the visual list of the first client terminal device and the first client terminal device, a lower priority may be set for the client terminal device. If there are relationships between multiple client terminal devices in the visual list of the first client terminal device and the first client terminal device, when the priorities are set for the multiple client terminal devices having the preset relationships with the first client terminal device, a higher priority may be set for a client terminal device, the registration area of which is close to that of the first client terminal device, in the multiple client terminal devices having preset relationships with the first client terminal device. Accordingly, a lower priority may be set for a client terminal device, the registration area of which is far from that of the first client terminal device, in the multiple client terminal devices having preset relationships with the first client terminal device. If there is no relationship between the multiple client terminal devices and the first client terminal device, when the priorities are set for the multiple client terminal devices which do not have preset relationships with the first client terminal device, a higher priority may be set for a client terminal device, the registration area of which is close to that of the first client terminal device, in the multiple client terminal devices which do not have preset relationships with the first client terminal device. Accordingly, a lower priority may be set for a client terminal device, the registration area of which is far from that of the first client terminal device, in the multiple client terminal devices which do not have preset relationships with the first client terminal device. If the priorities of the client terminal devices currently displayed in the visual list of the first client terminal device may not be distinguished according to the relationship between the registration areas of the client terminal devices currently displayed in the visual list of the first client terminal device and the registration area of the first client terminal device and/or whether there are relationships between the currently-displayed client terminal devices and the first client terminal device, the priorities of the currently-displayed client terminal devices may be set according to registration time of the currently-displayed client terminal devices.

For instance, when client terminal device 7 plays games with the first client terminal device, if the client terminal device 7 and the first client terminal device belong to a same group and a game scene area, in which the client terminal device 7 may be registered and the game scene area, in which the first client terminal device may be registered belong to the same area, the display priority of the client terminal device 7 may be set as 5. If there is no preset relationship between client terminal device 8 and the first client terminal device and the game scene area, in which the client terminal device 8 may be registered and the game scene area, in which the first client terminal device may be registered may be adjacent areas, the display priority of the client terminal device 8 may be set as 3. According to an example of the present disclosure, the first client terminal device may display itself. The highest priority, i.e. 10, may be set for itself (i.e. the client terminal 1).

According to an example of the present disclosure, the larger the value is, the higher the priority is. In the alternative, it may be set the smaller the value is, the higher the priority is. Examples of the present disclosure do not make limitation on this.

Operations A1 to A4 may be described hereinafter accompanying with an example.

When the server receives a registration request from the first client terminal device, information relating the type of the first client terminal device in the registration request may be obtained. For instance, the type of the first client terminal device may be a mobile phone based on the KJava platform, the corresponding relationship between the type of the client terminal device and the number of the visual users in table 2 may be searched. The number of the visual users of the first client terminal device may be 3. That is, the first client terminal device at most may display 3 client terminal devices including itself.

The server may read the locally-stored visual list of the first client terminal device and determine the number of the client terminal devices currently-displayed in the visual list of the first client terminal device. As shown in table 4, the number of client terminal devices currently-displayed in the visual list of the first client terminal device may be 3.

Therefore, the number of the client terminal devices currently displayed in the visual list of the first client terminal device may not be less than the number of the visual users of the first client terminal device. It may be obtained that the first client terminal device and the second client terminal device may belong to the same group by searching for the corresponding relationship between the client terminal device and the group as shown FIG. 2. The priority of the client terminal device 1 currently displayed in the visual list of the first client terminal device may be 10, the priority of the client terminal device 7 may be 5 and the priority of the client terminal device 8 may be 3. Therefore, the client terminal device 8 with the lowest priority may be deleted, the information of the second client terminal device may be sent to the first client terminal device, so that the first client terminal device may display the information of the second client terminal device may be displayed. Therefore, the visual list of the first client terminal device may be shown in table 5, the first client terminal device may display information of the client terminal device 1, client terminal device 2 and client terminal device 7.

TABLE 5

| Client terminal device 1 |
| Client terminal device 2 |
| Client terminal device 7 |

Operations A1 to A4 may be performed to ensure that the number of the client terminal devices currently displayed in the visual list of the first client terminal device may not exceed the number of the visual users of the first client terminal device, so that the first client terminal device may smoothly display its visual client terminal devices.

The operations A1 to A4 may be performed to ensure that the first client terminal device may display the information of the second client terminal device having a preset relationship with the first client terminal device, which may be convenient for information interaction and information transfer between the first client terminal device and the second client terminal device having the preset relationship with the first client terminal device.

In block 206, the information of the first client terminal device may be sent to the second client terminal device, so that the second client terminal device may display information of the first client terminal device in the visual list of the second client terminal device.

As an optional example, before the information of the first client terminal device is sent to the second client terminal device, the method may further include following operations.

In operation B1, number of visual users of the second client terminal device may be obtained.

The method for obtaining the visual users of the second client terminal device may be the same as that for obtaining the visual users of the first client terminal device, which may not be repeated here.

In operation B2, number of client terminal devices currently displayed in the visual list of the second client terminal device may be obtained.

The method for obtaining the number of the client terminal devices currently displayed in the visual list of the second client terminal device may be the same as that for obtaining the number of the client terminal devices currently displayed in the visual list of the first client terminal device, which may not be repeated here. For instance, the local visual list of the second client terminal device may be shown in table 6. The number of the client terminal devices currently displayed in the visual list of the second client terminal device may be obtained by reading the local visual list of the second client terminal device.

TABLE 6

| Client terminal device 2 |
| Client terminal device 7 |
| Client terminal device 8 |
| Client terminal device 9 |
| Client terminal device 11 |
| Client terminal device 12 |
| Client terminal device n |
| Client terminal device 15 |
| Client terminal device 13 |

In operation B3, whether the number of the client terminal devices currently displayed in the visual list of the second client terminal device is less than the number of the visual users of the second client terminal device may be determined.

If the number of the client terminal devices currently displayed in the visual list of the second client terminal device is less than the number of the visual users of the second client terminal device, block 206 may be performed.

If the number of the client terminal devices currently displayed in the visual list of the second client terminal device is not less than the number of the visual users of the second client terminal device, operation B4 may be performed.

In operation B4, it may be determined that there is a preset relationship between the first client terminal device and the second client terminal device. The preset relationship may be described hereinbefore, which may not be repeated here.

If there is a preset relationship between the first client terminal device and the second client terminal device, the client terminal devices currently displayed in the visual list of the second client terminal device may be prioritized, the information of a client terminal device with the lowest priority in the visual list of the second client terminal device may be deleted and block 206 may be performed.

If there is no preset relationship between the second client terminal device and the first client terminal device, the flow may be terminated.

The method for prioritizing the client terminal devices currently displayed in the visual list of the second client terminal device may be the same as that for prioritizing the client terminal devices currently displayed in the visual list of the first client terminal device, which may not be repeated here.

The operations B1 to B4 may be described hereinafter accompanying with examples.

When the server receives a registration request from the second client terminal device, the server may obtain the information relating to the type of the second client terminal device from the registration request. For instance, if the type of the second client terminal device is the mobile phone based on the Android platform, the corresponding relationship between the type of the client terminal device and the number of the visual users as shown in table 2 may be searched to obtain that the number of the visual users of the second client terminal device may be 10. That is, the second client terminal device at most may display 10 client terminal devices including the second client terminal device.

The server may read the local visual list of the second client terminal device and determine the number of the client terminal devices currently displayed in the visual list of the second client terminal device. As shown in table 6, the number of the client terminal devices currently displayed in the visual list of the second client terminal device may be 9.

Therefore, the number of the client terminal devices currently displayed in the visual list of the second client terminal device may be less than that of the visual users of the second client terminal device. The information of the first client terminal device may be sent to the second client terminal device, so that the second client terminal device may display the information of the first client terminal device. The visual list of the second client terminal device may be shown in table 7. The second client terminal device may display information of client terminal devices 2, 7, 8, 9, 11, 12, n, 15, 13 and 1.

TABLE 7

| Client terminal device 2 |
| Client terminal device 7 |
| Client terminal device 8 |
| Client terminal device 9 |
| Client terminal device 11 |
| Client terminal device 12 |
| Client terminal device n |
| Client terminal device 15 |
| Client terminal device 13 |
| Client terminal device 1 |

Operations B1 to B4 may be performed to ensure that the number of the client terminal devices currently displayed in the visual list of the second client terminal device may not exceed endurance of the second client terminal device, so that the second client terminal device may smoothly display its visual users.

Furthermore, operations B1 to B4 may be performed to ensure the second client terminal device may display the information of the first client terminal device having a preset relationship with the second client terminal device, which may be convenient for the information interaction and information transfer between the second client terminal device and the first client terminal device having a preset relationship with the second client terminal device.

After operations of blocks 205 and 206, it may be ensured that the second client terminal device may display the information of the first client terminal device while the first client terminal device displays the information of the second client terminal device, so that the visual list of the first client terminal device and the second client terminal device may be symmetric. It may be convenient for the information interaction and information transfer between the first client terminal device and the second client terminal device.

According to an example of the present disclosure, during the game, the server may send uplink network messages to the client terminal devices currently displayed in the visual list of the first client terminal device or the second client terminal device and may not send the uplink network messages to the client terminal devices which may not be displayed in the first client terminal device or the second client terminal device, to reduce the number of the uplink network messages sent by the server and avoid a problem of uplink network congestion resulting from a network broadcasting storm.

Furthermore, during the game, if a client terminal device currently displayed in the visual list of the first client terminal device or the second client terminal device leaves the game, the client terminal device leaving the game may be deleted from the visual list of the first client terminal device or the second client terminal device, so that the visual client terminal devices of the first client terminal device or the second client terminal device may be the online client terminal devices. It may be ensured that the first client terminal device or the second client terminal device may effectively and timely communicate with the client terminal devices currently displayed in its visual list.

The technical scheme provided by this example of the present disclosure may bring following technical effects. When the first client terminal device and the second client terminal device are located at the same scene, the information of the second client terminal device may be sent to the first client terminal device, so that the first client terminal device may display the information of the second client terminal device in the visual list of the first client terminal device. The information of the first client terminal device may be sent to the second client terminal device, so that the second client terminal device may display information of the first client terminal device in the visual list of the second client terminal device. With this example of the present disclosure, while ensuring that the first client terminal device may display the information of the second client terminal device, the second client terminal device also may display the information of the first client terminal device. Therefore, the visual list of the first client terminal device and the second client terminal device may be symmetric which may be convenient for the information interaction and transfer between the first client terminal device and the second client terminal device.

The Third Example

Figure 4:
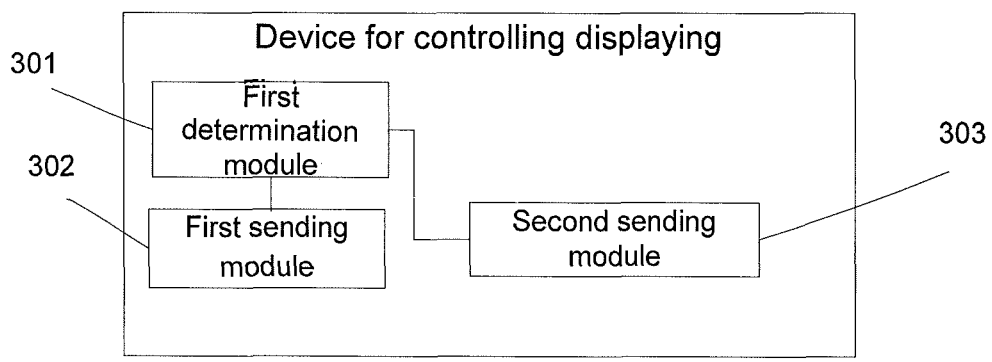
FIG. 4 is a schematic diagram illustrating structure of a device for controlling displaying in accordance with a third example of the present disclosure.

Referring to FIG. 4, an example of the present disclosure may provide a device for displaying controlling. The device may be the same as the server described in the second example. The device may include a first determination module 301, a first sending module 302 and a second sending module 303.

The first determination module 301 may be to determine whether a registered first client terminal device and a registered second client terminal device are located at a same scene;

the first sending module 302 may be to send information of the second client terminal device to the first client terminal device if the first client terminal device and the second client terminal device are located at the same scene, so that the first client terminal device displays the information of the second client terminal device in a visual list of the first client terminal device; and The second sending module 303 may be to send information of the first client terminal device to the second client terminal device if the first client terminal device and the second client terminal device are located at the same scene, so that the second client terminal device displays the information of the first client terminal device in a visual list of the second client terminal device.

Figure 5:
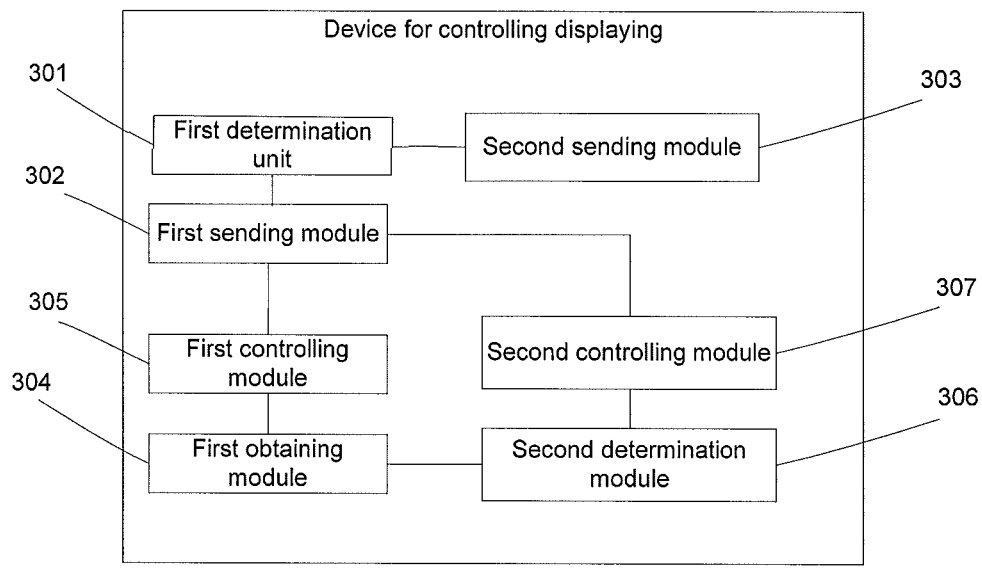
FIG. 5 is a schematic diagram illustrating another structure of the device for controlling displaying provided by the third example.

Furthermore, referring to FIG. 5, the device shown in FIG. 4 in this example of the present disclosure may further include:

a first obtaining module 304, to obtain number of visual users of the first client terminal device and number of client terminal devices currently displayed in the visual list of the first client terminal device;

a first controlling module 305, to control the first sending module 302 to send the information of the second client terminal device to the first client terminal device if the number of the client terminal devices currently displayed in the visual list of the first client terminal device is less than the number of the visual users of the first client terminal device;

a second determination module 306, to determine whether there is a preset relationship between the first client terminal device and the second client terminal device if the number of the client terminal devices currently displayed in the visual list of the first client terminal device is not less than the number of the visual users of the first client terminal device; and a second controlling module 307, to prioritize the client terminal devices currently displayed in the visual list of the first client terminal device if there is a preset relationship between the first client terminal device and the second client terminal device, delete information of a client terminal device with the lowest priority from the visual list of the first client terminal device and control the first sending module 302 to send the information of the second client terminal device to the first client terminal device.

Figure 6:
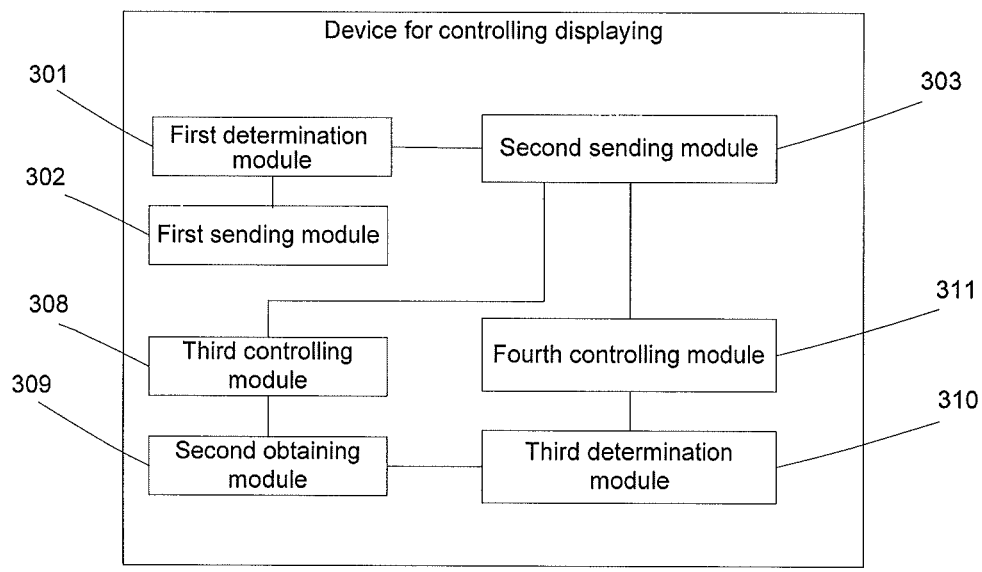
FIG. 6 is a schematic diagram illustrating another structure of the device for controlling displaying provided by the third example.

Furthermore, referring to FIG. 6, the device shown in FIG. 4 in this example of the present disclosure may further include:

a second obtaining module 308, to obtain number of visual users of the second client terminal device and number of client terminal devices currently displayed in the visual list of the second client terminal device;

a third controlling module 309, to control the second sending module 303 to send the information of the first client terminal device to the second client terminal device if the number of the client terminal devices currently displayed in the visual list of the second client terminal device is less than the number of the visual users of the second client terminal device;

a third determination module 310, to determine whether there is a preset relationship between the first client terminal device and the second client terminal device if the number of the client terminal devices currently displayed in the visual list of the second client terminal device is not less than the number of the visual users of the second client terminal device; and a fourth controlling module 311, to prioritize the client terminal devices currently displayed in the visual list of the second client terminal device if there is a preset relationship between the first client terminal device and the second client terminal device, delete information of a client terminal device with the lowest priority from the visual list of the second client terminal device and control the second sending module 303 to send the information of the first client terminal device to the second client terminal device.

The technical scheme provided by this example of the present disclosure may bring following technical effects. When the first client terminal device and the second client terminal device are located at the same scene, the information of the second client terminal device may be sent to the first client terminal device, so that the first client terminal device may display the information of the second client terminal device in the visual list of the first client terminal device. The information of the first client terminal device may be sent to the second client terminal device, so that the second client terminal device may display information of the first client terminal device in the visual list of the second client terminal device. With this example of the present disclosure, while ensuring that the first client terminal device may display the information of the second client terminal device, the second client terminal device also may display the information of the first client terminal device. Therefore, the visual list of the first client terminal device and the second client terminal device may be symmetric which may be convenient for the information interaction and transfer between the first client terminal device and the second client terminal device.

It should be noted that when the above devices for controlling displaying provided by the example of the present disclosure controls the displaying, the example may be described according to the division of the above function modules. In practice, the above functions may be completed by different functional modules. That is, the device may be divided into different functional modules to complete all or partial of the above functions. Furthermore, the device for controlling displaying and the method for controlling displaying may belong to a same idea. The implementation process of the device may be shown in the method examples, which may not be repeated here.

Number of the above examples may only be used for description, which may not represent advantages and disadvantages of the examples.

It may be well known to an ordinary skilled in that art of the present disclosure that all or partial blocks in the above examples may be implemented via hardware or implemented by a program instructing the hardware. The program may be stored in a computer readable storage medium. The above mentioned storage medium may be a read-only storage, a disk, a Compact Disc (CD), a Read-Only Memory (ROM), or a Random Access Memory (RAM).

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for controlling a display, comprising:
    determining whether a registered first client terminal device and a registered second client terminal device are located at a same scene;
    obtaining a number of visual users of the first client terminal device and a number of client terminal devices currently displayed in a visual list of the first client terminal device;
    sending information of the second client terminal device to the first client terminal device if the first client terminal device and the second client terminal device are located at the same scene and if the number of the client terminal devices currently displayed in the visual list of the first client terminal device is less than the number of the visual users of the first client terminal device, so that the first client terminal device displays the information of the second client terminal device in the visual list of the first client terminal device; and
    sending information of the first client terminal device to the second client terminal device, so that the second client terminal device displays the information of the first client terminal device in a visual list of the second client terminal device;
    wherein the scene is equally divided into multiple areas according to display pixels of the scene; the method further comprises:
    prioritizing the client terminal devices displayed in the visual list of the first client terminal device according to a relationship between an area into which each of the client terminal devices displayed in the visual list of the first client terminal device registers, and an area into which the first client terminal device registers;
    prioritizing client terminal devices displayed in the visual of the second client terminal device according to a relationship between an area into which each of the client terminal devices displayed in the visual list of the second client terminal device registers, and an area into which the second client terminal device registers.

2. The method according to claim 1, further comprising:
    determining whether there is a preset relationship between the first client terminal device and the second client terminal device if the number of the client terminal devices currently displayed in the visual list of the first client terminal device is not less than the number of the visual users of the first client terminal device;
    prioritizing the client terminal devices currently displayed in the visual list of the first client terminal device if there is a preset relationship between the first client terminal device and the second client terminal device, deleting information of a client terminal device with the lowest priority from the visual list of the first client terminal device and sending the information of the second client terminal device to the first client terminal device.

3. The method according to claim 1, where before sending the information of the first client terminal device to the second client terminal device, the method further comprises:
    obtaining a number of visual users of the second client terminal device and number of client terminal devices currently displayed in the visual list of the second client terminal device;
    sending the information of the first client terminal device to the second client terminal device if the number of the client terminal devices currently displayed in the visual list of the second client terminal device is less than the number of the visual users of the second client terminal device.

4. The method according to claim 3, further comprising:
    determining whether there is a preset relationship between the first client terminal device and the second client terminal device if the number of the client terminal devices currently displayed in the visual list of the second client terminal device is not less than the number of the visual users of the second client terminal device;
    prioritizing the client terminal devices currently displayed in the visual list of the second client terminal device if there is a preset relationship between the first client terminal device and the second client terminal device, deleting information of a client terminal device with the lowest priority from the visual list of the second client terminal device and sending the information of the first client terminal device to the second client terminal device.

5. The method according to claim 1, wherein the preset relationship comprises belonging to a same group or belonging to an associated group.

6. The method according to claim 1, wherein the scene comprises resources allocated by a server to multiple client terminal devices for playing a game.

7. A device for controlling a display, comprising:
a first determination module, a first sending module, a second sending module, a first obtaining module and a first controlling module; wherein
the first determination module determining whether a registered first client terminal device and a registered second client terminal device are located at a same scene;
the first obtaining module obtaining a number of visual users of the first client terminal device and a number of client terminal devices currently displayed in a visual list of the first client terminal device;
the first controlling module controlling the first sending module to send information of the second client terminal device to the first client terminal device if the number of the client terminal devices currently displayed in the visual list of the first client terminal device is less than the number of the visual users of the first client terminal device;
the first sending module sending the information of the second client terminal device to the first client terminal device if the first client terminal device and the second client terminal device are located at the same scene, so that the first client terminal device displays the information of the second client terminal device in the visual list of the first client terminal device; and
the second sending module sending information of the first client terminal device to the second client terminal device if the first client terminal device and the second client terminal device are located at the same scene, so that the second client terminal device displays the information of the first client terminal device in a visual list of the second client terminal device;
wherein the scene is equally divided into multiple areas according to display pixels of the scene;
the device further comprises:
a second controlling module, prioritizing the client terminal devices displayed in the visual list of the first client terminal device according to a relationship between an area, into which each of the client terminal devices displayed in the visual list of the first client terminal device registers, and an area, into which the first client terminal device registers; and
a fourth controlling module, prioritizing client terminal devices displayed in the visual list of the second client terminal device according to a relationship between an area, into which each of the client terminal devices displayed in the visual list of the second client terminal device registers, and an area, into which the second client terminal device registers.

8. The device according to claim 7, further comprising:
a second determination module, determining whether there is a preset relationship between the first client terminal device and the second client terminal device if the number of the client terminal devices currently displayed in the visual list of the first client terminal device is not less than the number of the visual users of the first client terminal device;
a second controlling module, prioritizing the client terminal devices currently displayed in the visual list of the first client terminal device if there is a preset relationship between the first client terminal device and the second client terminal device, delete information of a client terminal device with the lowest priority from the visual list of the first client terminal device and control the first sending module to send the information of the second client terminal device to the first client terminal device.

9. The device according to claim 8, further comprising:
a second obtaining module, obtaining a number of visual users of the second client terminal device and number of client terminal devices currently displayed in the visual list of the second client terminal device; and
a third controlling module, controlling the second sending module to send the information of the first client terminal device to the second client terminal device if the number of the client terminal devices currently displayed in the visual list of the second client terminal device is less than the number of the visual users of the second client terminal device.

10. The device according to claim 9, further comprising:
a third determination module, determining whether there is a preset relationship between the first client terminal device and the second client terminal device if the number of the client terminal devices currently displayed in the visual list of the second client terminal device is not less than the number of the visual users of the second client terminal device; and
a fourth controlling module, prioritizing the client terminal devices currently displayed in the visual list of the second client terminal device if there is a preset relationship between the first client terminal device and the second client terminal device, delete information of a client terminal device with the lowest priority from the visual list of the second client terminal device and control the second sending module to send the information of the first client terminal device to the second client terminal device.

11. One or more computer storage mediums including computer executable instructions, for executing a method for controlling a display, wherein the method comprises:
determining whether a registered first client terminal device and a registered second client terminal device are located at a same scene;
obtaining a number of visual users of the first client terminal device and number of client terminal devices currently displayed in a visual list of the first client terminal device;
sending information of the second client terminal device to the first client terminal device if the first client terminal device and the second client terminal device are located at the same scene and the number of the client terminal devices currently displayed in the visual list of the first client terminal device is less than the number of the visual users of the first client terminal device, so that the first client terminal device displays the information of the second client terminal device in the visual list of the first client terminal device; and
sending information of the first client terminal device to the second client terminal device, so that the second client terminal device displays the information of the first client terminal device in a visual list of the second client terminal device;
wherein the scene is equally divided into multiple areas according to display pixels of the scene; the method further comprises:
prioritizing the client terminal devices displayed in the visual list of the first client terminal device according to a relationship between an area, into which each of the client terminal devices displayed in the visual list of the first client terminal device registers, and an area, into which the first client terminal device registers;

prioritizing client terminal devices displayed in the visual is of the second client terminal device according to a relationship between an area, into which each of the client terminal devices displayed in the visual list of the second client terminal device registers, and an area, into which the second client terminal device registers.

12. The computer storage mediums according to claim 11, further comprising:
determining whether there is a preset relationship between the first client terminal device and the second client terminal device if the number of the client terminal devices currently displayed in the visual list of the first client terminal device is not less than the number of the visual users of the first client terminal device;
prioritizing the client terminal devices currently displayed in the visual list of the first client terminal device if there is a preset relationship between the first client terminal device and the second client terminal device, deleting information of a client terminal device with the lowest priority from the visual list of the first client terminal device and sending the information of the second client terminal device to the first client terminal device.

13. The computer storage mediums according to claim 11, wherein before sending the information of the first client terminal device to the second client terminal device, the method further comprises:
obtaining a number of visual users of the second client terminal device and number of client terminal devices currently displayed in the visual list of the second client terminal device;
sending the information of the first client terminal device to the second client terminal device if the number of the client terminal devices currently displayed in the visual list of the second client terminal device is less than the number of the visual users of the second client terminal device.

14. The computer storage mediums according to claim 13, further comprising:
determining whether there is a preset relationship between the first client terminal device and the second client terminal device if the number of the client terminal devices currently displayed in the visual list of the second client terminal device is not less than the number of the visual users of the second client terminal device;
prioritizing the client terminal devices currently displayed in the visual list of the second client terminal device if there is a preset relationship between the first client terminal device and the second client terminal device, deleting information of a client terminal device with the lowest priority from the visual list of the second client terminal device and sending the information of the first client terminal device to the second client terminal device.

15. The computer storage mediums according to claim 11, wherein the preset relationship comprises belonging to a same group or belonging to an associated group.

16. The computer storage mediums according to claim 11, wherein the scene comprises resources allocated by a server to multiple client terminal devices for playing a game.

17. A method for controlling a display, comprising:
determining whether a registered first client terminal device and a registered second client terminal device are located at a same scene;
sending information of the second client terminal device to the first client terminal device if the first client terminal device and the second client terminal device are located at the same scene, so that the first client terminal device displays the information of the second client terminal device in the visual list of the first client terminal device; and
obtaining a number of visual users of the second client terminal device and number of client terminal devices currently displayed in the visual list of the second client terminal device;
sending information of the first client terminal device to the second client terminal device if the number of the client terminal devices currently displayed in the visual list of the second client terminal device is less than the number of the visual users of the second client terminal device, so that the second client terminal device displays the information of the first client terminal device in a visual list of the second client terminal device;
wherein the scene is equally divided into multiple areas according to display pixels of the scene; the method further comprises:
prioritizing client terminal devices displayed in the visual list of the first client terminal device according to a relationship between an area into which each of the client terminal devices displayed in the visual list of the first client terminal device registers, and an area into which the first client terminal device registers;
prioritizing the client terminal devices displayed in the visual list of the second client terminal device according to a relationship between an area into which each of the client terminal devices displayed in the visual list of the second client terminal device registers, and an area into which the second client terminal device registers.

18. The method according to claim 17, further comprising:
determining whether there is a preset relationship between the first client terminal device and the second client terminal device if the number of the client terminal devices currently displayed in the visual list of the second client terminal device is not less than the number of the visual users of the second client terminal device;
prioritizing the client terminal devices currently displayed in the visual list of the second client terminal device if there is a preset relationship between the first client terminal device and the second client terminal device, deleting information of a client terminal device with the lowest priority from the visual list of the second client terminal device and sending the information of the first client terminal device to the second client terminal device.

19. The method according to claim 18, wherein the preset relationship comprises: belonging to a same group or belonging to an associated group.

* * * * *